(12) United States Patent
Horai

(10) Patent No.: US 9,837,676 B2
(45) Date of Patent: Dec. 5, 2017

(54) FUEL CELL SINGLE CELL

(71) Applicant: NISSAN MOTOR CO., LTD., Yokohama-shi, Kanagawa (JP)

(72) Inventor: Atsushi Horai, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/903,632

(22) PCT Filed: Apr. 22, 2014

(86) PCT No.: PCT/JP2014/061251
§ 371 (c)(1),
(2) Date: Jan. 8, 2016

(87) PCT Pub. No.: WO2015/004969
PCT Pub. Date: Jan. 15, 2015

(65) Prior Publication Data
US 2016/0156053 A1 Jun. 2, 2016

(30) Foreign Application Priority Data
Jul. 10, 2013 (JP) .................. 2013-144604

(51) Int. Cl.
*H01M 8/10* (2016.01)
*H01M 8/04* (2016.01)
(Continued)

(52) U.S. Cl.
CPC ....... *H01M 8/1004* (2013.01); *H01M 4/8605* (2013.01); *H01M 4/8657* (2013.01);
(Continued)

(58) Field of Classification Search
CPC ....... H01M 2008/1095; H01M 4/8605; H01M 4/8657; H01M 4/8896; H01M 8/0206;
(Continued)

(56) References Cited

U.S. PATENT DOCUMENTS 6,007,933 A 12/1999 Jones
2005/0221153 A1 10/2005 Sugimoto et al.
(Continued)

FOREIGN PATENT DOCUMENTS

JP 2007-149357 A 6/2007
JP 2009-245871 A 10/2009
(Continued)

*Primary Examiner* — Carlos Barcena
(74) *Attorney, Agent, or Firm* — Foley & Lardner LLP

(57) ABSTRACT

A single cell C includes a membrane electrode assembly M in which an electrolyte membrane 1 is interposed between a pair of electrode layers 2, 3, and a pair of separators 4 that form gas channels C between the pair of separators 4 and the membrane electrode assembly M, wherein the electrode layers 2, 3 include first gas diffusion layers 2B, 3B of a porous material disposed at the side facing the electrolyte membrane 1 and second gas diffusion layers 2C, 3C that are composed of a metal porous body having arrayed many holes K, and a part of the first gas diffusion layers 2B, 3B penetrates the holes K of the second gas diffusion layers 2C, 3C to form protrusions T. Accordingly, the surface of the electrode layers 2, 3 has a fine uneven structure. As a result, an improvement in liquid water discharging function and an improvement in power generating function were achieved at the same time.

10 Claims, 6 Drawing Sheets

(51) Int. Cl.
| | |
|---|---|
| H01M 4/86 | (2006.01) |
| H01M 8/1004 | (2016.01) |
| H01M 8/0206 | (2016.01) |
| H01M 8/0232 | (2016.01) |
| H01M 8/0245 | (2016.01) |
| H01M 8/026 | (2016.01) |
| H01M 8/04291 | (2016.01) |
| H01M 8/1007 | (2016.01) |
| H01M 8/04119 | (2016.01) |
| H01M 8/04082 | (2016.01) |
| H01M 4/88 | (2006.01) |
| H01M 8/0234 | (2016.01) |
| H01M 8/0239 | (2016.01) |
| H01M 8/0243 | (2016.01) |
| H01M 8/0273 | (2016.01) |
| H01M 8/1018 | (2016.01) |
| H01M 8/2483 | (2016.01) |
| H01M 8/2457 | (2016.01) |

(52) U.S. Cl.
CPC ......... *H01M 8/0206* (2013.01); *H01M 8/026* (2013.01); *H01M 8/0232* (2013.01); *H01M 8/0245* (2013.01); *H01M 8/04156* (2013.01); *H01M 8/04201* (2013.01); *H01M 8/04291* (2013.01); *H01M 8/1007* (2016.02); *H01M 4/8896* (2013.01); *H01M 8/0234* (2013.01); *H01M 8/0239* (2013.01); *H01M 8/0243* (2013.01); *H01M 8/0273* (2013.01); *H01M 8/2457* (2016.02); *H01M 8/2483* (2016.02); *H01M 2008/1095* (2013.01)

(58) Field of Classification Search
CPC ............. H01M 8/0232; H01M 8/0234; H01M 8/0239; H01M 8/0243; H01M 8/0245; H01M 8/026; H01M 8/0273; H01M 8/04156; H01M 8/04201; H01M 8/04291; H01M 8/1004; H01M 8/1007; H01M 8/2457; H01M 8/2483
See application file for complete search history.

(56) References Cited

U.S. PATENT DOCUMENTS

| | | |
|---|---|---|
| 2009/0111001 A1 | 4/2009 | Otake |
| 2012/0164553 A1 | 6/2012 | Gemba et al. |
| 2015/0072262 A1 | 3/2015 | Shiomi et al. |

FOREIGN PATENT DOCUMENTS

| | | |
|---|---|---|
| JP | 2010-027243 A | 2/2010 |
| WO | WO-2008/102578 A1 | 8/2008 |
| WO | WO 2008/138396 A1 | 11/2008 |
| WO | WO 2013/150800 A1 | 10/2013 |

(A)

(B)

FUEL CELL SINGLE CELL

TECHNICAL FIELD

The present invention relates to a fuel cell single cell used for polymer electrolyte fuel cells (PEFC) and the like.

BACKGROUND ART

One of conventional fuel cell single cells is described in Patent Document 1 titled "Fuel Cell and Electrode Structure for Fuel Cell". The fuel cell described in Patent Document 1 has an MPL that is composed of a sparse area made of electrically conductive particles with a large particle size and a dense area made of electrically conductive particles with a smaller particle size. The upper face of the MPL is in contact with a gas diffusion layer, and the lower face is in contact with a catalyst layer.

In the fuel cell, the particles of the dense area are of such a particle size that the saturated vapor pressure in the pores determined by the Kelvin equation is higher than the saturated vapor pressure in an open space. In the fuel cell, this makes the saturated vapor pressure in the sparse area lower than the saturated vapor pressure in the dense area, and condensation of water vapor in the dense area is thereby reduced, which is generated in the catalyst layer.

CITATION LIST

Patent Literature

Patent Document 1: JP 2009-245871A

SUMMARY OF INVENTION

Technical Problem

However, in conventional fuel cells including the above-described one, since the dense area has a porosity determined by the Kelvin equation at a nano level, gas diffusion is greatly degraded once liquid water is condensed in the sparse area, which results in the decreased power generation performance. Accordingly, it has been required to solve the problem.

The present invention was made in view of the above-described problem with the prior art, and an object thereof is to provide a fuel cell single cell in which an improvement in discharging function of liquid water generated during power generation and an improvement in power generation performance are achieved at the same time.

Solution to Problem

The fuel cell single cell of the present invention includes a membrane electrode assembly in which an electrolyte membrane is interposed between a pair of electrode layers, and a pair of separators that forms gas channels between the pair of separators and the membrane electrode assembly. In the fuel cell single cell, the electrode layers of the membrane electrode assembly includes a first gas diffusion layer of a porous material disposed at the side facing the electrolyte membrane and a second gas diffusion layer composed of a metal porous body with arrayed many holes, and a part of the first gas diffusion layer penetrates the second gas diffusion layer through the holes to form protrusions. This configuration serves as a means for solving the problem with the prior art.

Advantageous Effects of Invention

In the fuel cell single cell of the present invention, the electrode layers have a fine uneven structure on the surface, which is composed of the protrusions of the first gas diffusion layer and the second gas diffusion layer. The fine uneven structure can enhance the surface properties (affinity/repellency to water) of the electrode layers compared to an electrode layer composed of only a first gas diffusion layer. This facilitates discharging liquid water that is generated during power generation. Further, this also improves gas diffusion (oxygen transportation) in the electrode layers, and an improvement in power generation performance can therefore be achieved. That is, an improvement in liquid water discharging function and an improvement in power generating function can be achieved at the same time.

In the fuel single cell, water repellency can be imparted to the electrode layer surfaces without applying water repellent finish to the second gas diffusion layer, which is constituted by a metal porous body. Therefore, the electrical conductivity of the second gas diffusion layer can be readily ensured, which also improves the power generating function.

DESCRIPTION OF EMBODIMENTS (First Embodiment)

Figure 1:
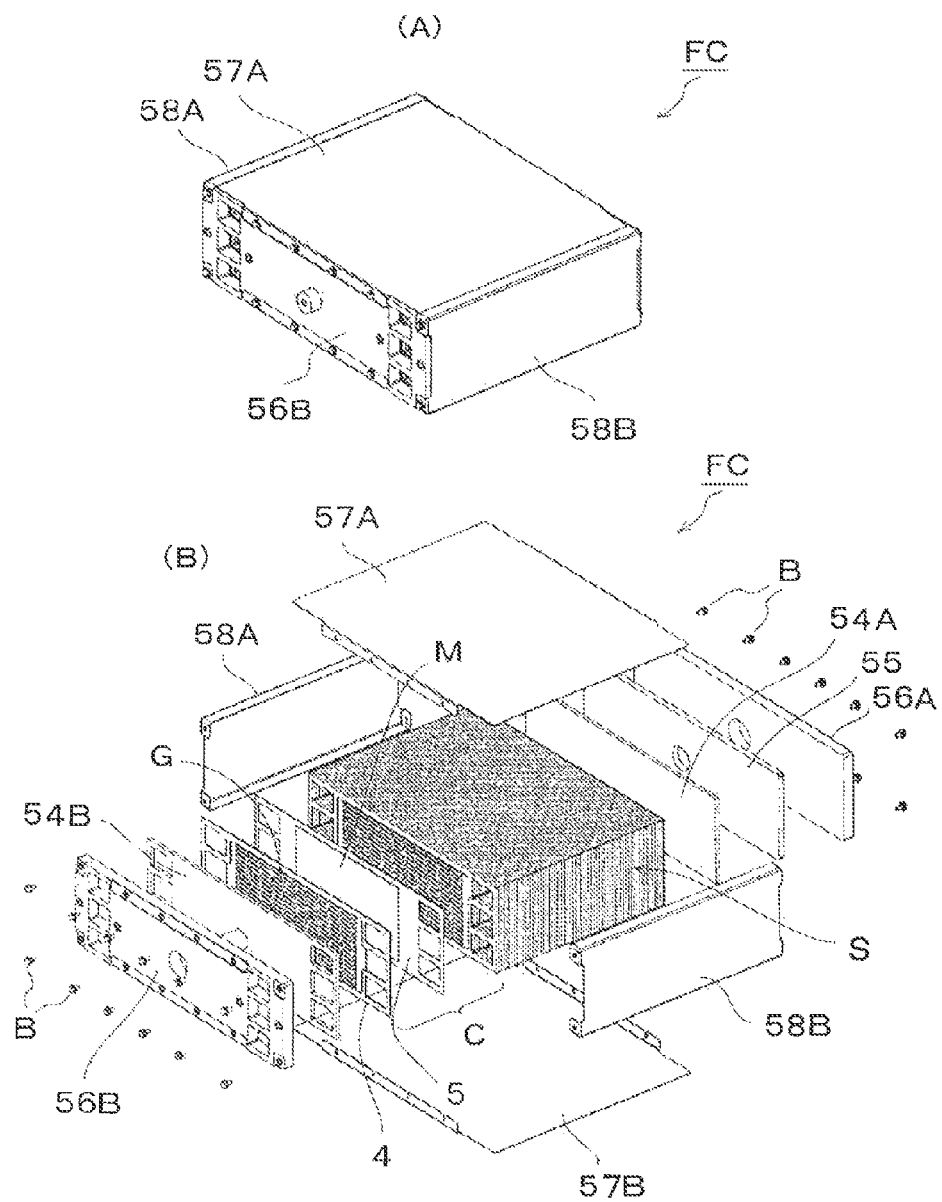
FIG. 1 are (A) perspective view and (B) an exploded perspective view of a fuel cell using fuel cell single cells of the present invention.

A fuel cell FC of FIG. 1 includes a stack S that is constituted by a stacked plurality of fuel cell single cells (hereinafter referred to as "single cells") having a rectangular plate shape. The fuel cell FC also includes an end plate 56 disposed on one end in the stacking direction of the stack S (right end in FIG. 1B) via a current collector plate 54A and a spacer 55, and an end plate 56B disposed on the other end via a current collector plate 54B. The fuel FC further includes fastening plates 57A, 57B disposed on opposite faces of the stack S corresponding to the long sides of the single cells C (upper and lower faces in FIG. 1 (B)), and reinforcing plates 58A, 58B disposed on opposite faces corresponding to the short sides.

In the fuel cell FC, the fastening plates 57A, 57B and the reinforcing plates 58A, 58B are coupled to both of the end plates 56A, 56B by means of bolts B. As described above, the fuel cell FC has a case-integrated structure as illustrated in FIG. 1 (A), which restrains and presses the stack S in the stacking direction to apply a predetermined contact pressure to the individual single cells C so that the gas sealing property, the electrical conductivity and the like are maintained at a high level.

Figure 2:
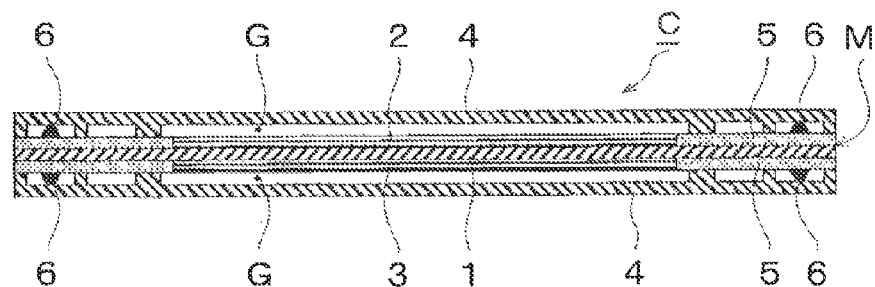
FIG. 2 are (A) a cross sectional view and (B) a plan view of a fuel cell single cell of FIG. 1.
Figure 2:
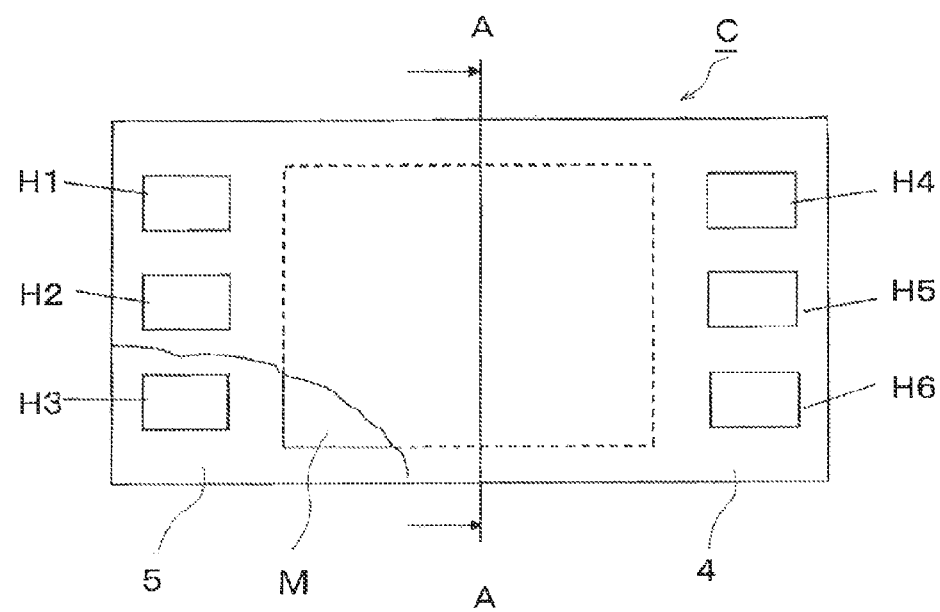

As illustrated in FIG. 2, each of the single cells C of the above-described fuel cell FC includes a membrane electrode assembly M that includes an electrolyte membrane 1 interposed between a pair of electrode layers 2, 3, and a pair of separators 4, 4 that form gas channels G, G between the separators 4, 4 and the membrane electrode assembly M. FIG. 2 (A) is a cross sectional view taken along the line A-A in FIG. 2 (B).

The membrane electrode assembly M, which is a so-called MEA, includes an electrolyte membrane 1 of a solid polymer interposed between the anode and cathode electrode layers 2, 3. In the illustrated example, the membrane electrode assembly M includes a resin frame 5 that is integrally provided in the periphery. The electrode layers 2, 3 are described in detail below.

The separators 4, 4, which are made of stainless steel for example, have predetermined uneven faces formed by press working in which the faces of one plate oppose the faces of the other plate. The separators 4, 4 respectively form the anode and cathode gas channels G, G between the membrane electrode assembly M and the separators 4, 4.

The frame 5 and separators 4 of the membrane electrode assembly M have manifold holes H1 to H3 and H4 to H6 for flowing reaction gas and cooling fluid along the respective short sides. The reaction gas is anode gas (hydrogen-containing gas) or cathode gas (air), and the cooling fluid is, for example, water.

The manifold holes H1 to H3, which are arranged along the left short side in the written order from the top in FIG. 2(B), are configured respectively to supply the anode gas (H1), to supply the cooling fluid (H2) and to discharge the cathode gas (H3). These manifold holes are communicated with corresponding manifold holes in the stacking direction to form respective channels. The manifold holes H4 to H6, which are arranged along the right short side in the written order from the top in FIG. 2(B), are configured respectively to supply the cathode gas (H4), to discharge the cooling fluid (H5) and to discharge the anode gas (H6). These manifold holes are communicated with corresponding manifold holes in the stacking direction to form respective channels. The positional relationship of the manifold holes H1 to H6 may be partly or fully changed in respect of the type of fluid, supply and discharge or the like.

Gas sealers 6 are disposed between the edge parts of the separators 4 and the frame 5 and around the manifold holes H1 to H6, which are partly illustrated in FIG. 2 (A). When the plurality of single cells C are stacked, gas sealers 6 are also disposed between the single cells C, i.e. between adjacent separators 4. The gas sealers 6 airtightly separate flow areas of the cathode gas, anode gas and cooling fluid from each other in the respective interlayers. Further, the gas sealers 6 have openings at suitable locations in the periphery of the manifold holes H1 to H6 so as to allow only a predetermined fluid to flow in the respective interlayers.

Figure 3:
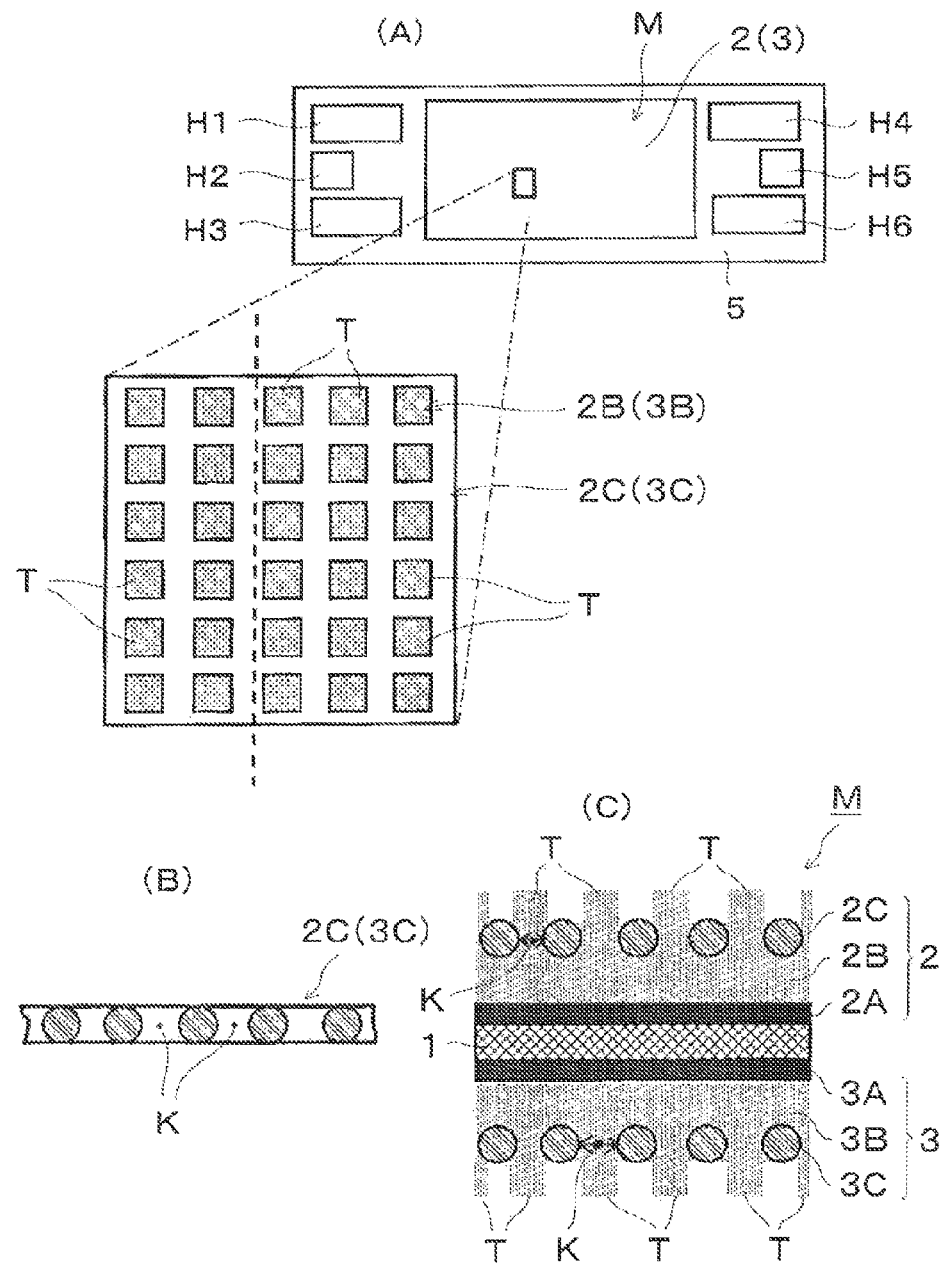
FIG. 3 are (A) a plan view of a fuel cell single cell according to a first embodiment and an enlargement thereof, (B) a cross sectional view of a second gas diffusion layer, and (C) a cross sectional view of the main part of the single cell.

In each single cell C of the fuel cell FC, as illustrated in FIG. 3, the electrode layers 2, 3 of the membrane electrode assembly M respectively includes catalyst layers 2A, 3A, first gas diffusion layers 2B, 3B of a porous material, and second gas diffusion layers 2C, 3C of a metal porous body, which are arranged in the written order from the electrolyte membrane 1.

The first gas diffusion layers 2B, 3B are made of, for example, a carbon material and have at least a water-repellant surface. Specifically, the first gas diffusion layers 2B, 3B are constituted by a binder-hardened random fiber laminate with water repellent finish by PTFE or the like or are constituted by an aggregate of carbon black or the like sintered with a binder such as PTFE.

The second gas diffusion layer 2C, 3C are constituted by a metal porous body that is different from the porous material of the first gas diffusion layers, and are electrically conductive. The second gas diffusion layers 2C, 3C are made of at least one metal selected from iron, stainless steel, aluminum, an aluminum alloy, chromium, a chromium alloy, nickel, a nickel alloy, magnesium and a magnesium alloy.

Regarding structure, the second gas diffusion layers 2C, 3C are specifically constituted by a metal mesh, a punching metal, an etching metal, an expanded metal or the like. In this embodiment, the second gas diffusion layers 2C, 3C are constituted by a metal mesh as illustrated in FIG. 3. When the second gas diffusion layers 2C and 3C are constituted by a metal mesh, the mesh openings serve as holes K. When they are constituted by a punching metal, an etched metal, an expanded metal or the like, the holes or openings serve as the holes K. In the following description, the linear parts of the second gas diffusion layers 2C, 3C are also referred to as a solid phase portion, and the mesh openings, which are the holes K, are also referred to as a gas phase portion.

In the electrode layers 2, 3 of each single cell C, a part of the first gas diffusion layers 2B, 3B penetrates the second gas diffusion layers 2C, 3C through the holes K to form protrusions T. Accordingly, the surfaces of the electrode layers 2, 3 have a fine uneven structure that is composed of the protrusions T of the first gas diffusion layers 2B, 3B and the solid phase portions of the second gas diffusion layers 2C, 3C.

When the respective gases are supplied to the anode and cathode electrode layers 2, 3, the single cells C with the above-described configuration generate electric energy by electrochemical reaction. When the single cells C are in this condition, since the surfaces of the electrode layers 2, 3 have the fine uneven structure, the electrode layers 2, 3 have enhanced surface properties (affinity/repellency to water) compared to the surface properties of the first gas diffusion layers 2B, 3B. Furthermore, since the surfaces of the first gas diffusion layers 2B, 3B are water-repellent, it can further enhance the water repellency of the surface of the electrode layers 2, 3. In the single cells C, this can facilitate discharging liquid water that is generated during the power generation. Furthermore, this can also improve gas diffusion (oxygen transportation) in the electrode layers 2, 3, and an improvement in power generation performance can therefore be achieved. That is, an improvement in liquid water discharging function and an improvement in power generating function can be achieved at the same time.

In the single cells C, the metal porous bodies of the second gas diffusion layers 2C, 3C are hydrophilic compared to the first gas diffusion layers 2B, 3B. Accordingly, in order to discharge liquid water, it seems reasonable to provide water repellent finish to the second gas diffusion layers 2C, 3C that are located at the outer side of the first gas diffusion layers 2B, 3B. However, such water repellent finish on the second gas diffusion layers 2C, 3C may increase the contact resistance with the separators and thereby decrease the power generation performance.

In contrast, in the single cells C according to this embodiment, the surfaces of the electrode layers 2, 3 have enhanced surface properties due to the fine uneven structure without water repellent finish to the second gas diffusion layers 2C, 3C. Furthermore, the surfaces of the electrode layers 2, 3 are also highly water repellent due to the first gas diffusion layers 2B, 3B. Accordingly, the electrical conductivity of the second gas diffusion layers 2C, 3C can be readily ensured. As a result, in the single cells C, the contact resistance between the second gas diffusion layers 2C, 3C and the separators 4 are not increased, which contributes to improving the power generating function.

In the single cells C, the water repellent surface of the first gas diffusion layers 2B, 3B further improves discharge of the liquid water. To show a specific example, water contact angle was measured for the surfaces of the first and second gas diffusion layers 2B, 3B, 2C, 3C and the surface with the fine uneven structure of the electrode layers 2, 3. As a result, the angle on the surface of the first gas diffusion layers 2B, 3B was 144.1°, and the angle on the surface of the second gas diffusion layers 2C, 3C was 83.1°.

Further, the contact angle on the surface of the electrode layers 2. 3 according to this embodiment was 160° (calculated value). That is, the fine uneven structure of the electrode layers 2, 3 allows water to form droplets on the protrusions T so as not to contact with the solid phase portion of the second gas diffusion layers 2C, 3C. It was demonstrated that high water repellency is thus obtained.

(Second Embodiment)

Figure 4:
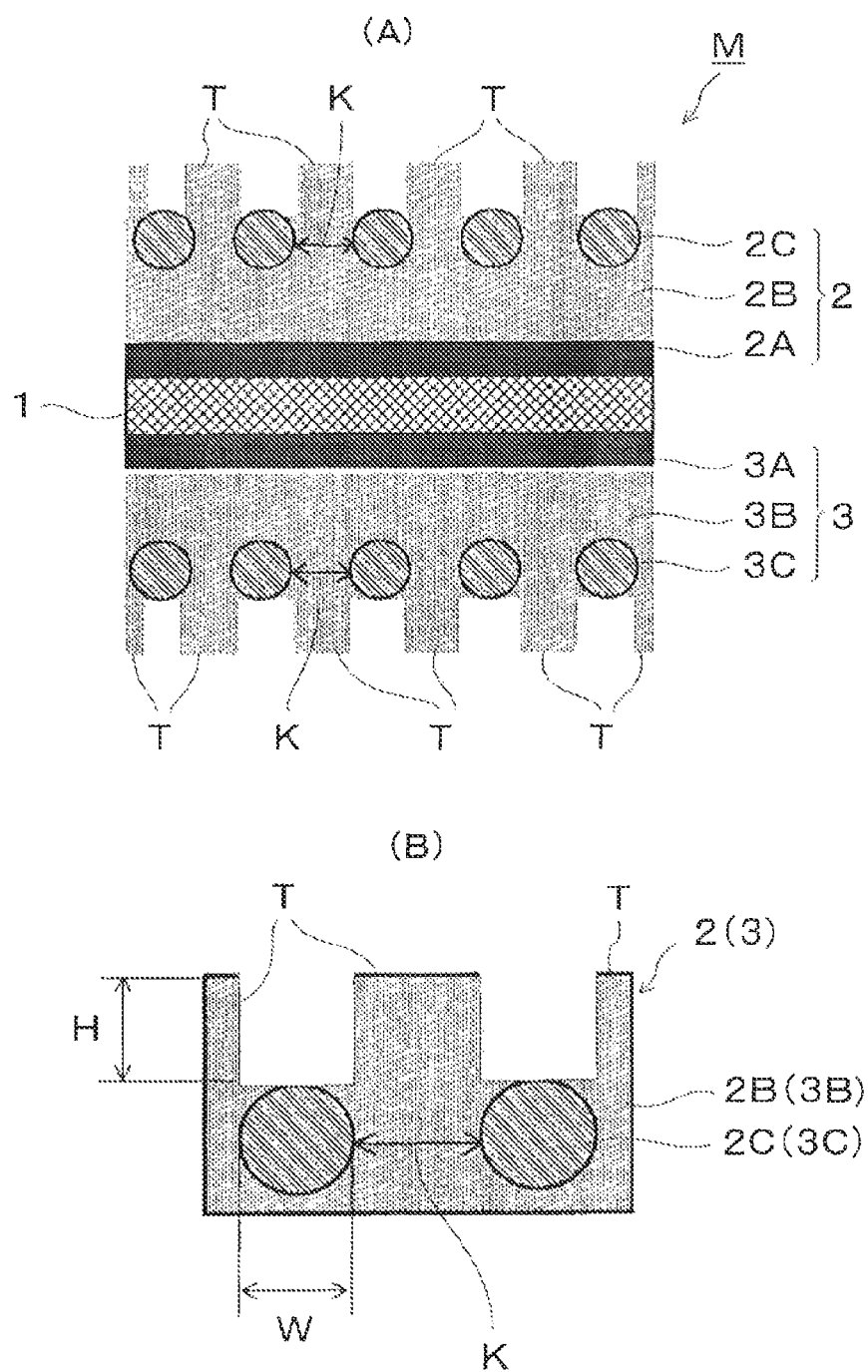
FIG. 4 are (A) a cross sectional view and (B) an enlarged cross sectional view of the main part of a fuel cell single cell according to a second embodiment.

FIG. 4 illustrates a second embodiment of the present invention. In the following embodiment, the same reference signs are denoted to the same components as those of the first embodiment, and the detailed description thereof are omitted.

The single cell C in the figure has the same basic configuration as the first embodiment although the separators 4 are not shown. Regarding protrusions T of first gas diffusion layers 2B, 3B and respective holes K of second gas diffusion layers 2C, 3C which correspond to each other in the thickness direction, the single cell C is configured such that the height H of a protrusion T is greater than a half of the width W (W/2) of a solid phase portion around a hole K, i.e. H≥W/2. When the second gas diffusion layer 2C, 3C are constituted by a metal mesh, the width W of the solid phase portion corresponds to the width of the linear parts of the mesh.

As with the previous embodiment, in the single cells C with the above-described configuration, the surface of the electrode layers 2, 3 have enhanced surface properties due to the fine uneven structure and are also highly water repellent due to the first gas diffusion layers 2B, 3B. Therefore, an improvement in liquid water discharging function and an improvement in power generating function can be achieved at the same time. Further, in the single cells C, since the height H of the protrusions T is greater than a half of the width W of the solid phase portion around the holes K, the single cells C exhibit high water repellency against water droplets that have a diameter equal to or greater than the width W of the solid phase portion. Therefore, a further improvement in liquid water discharging function is achieved.

(Third Embodiment)

Figure 5:
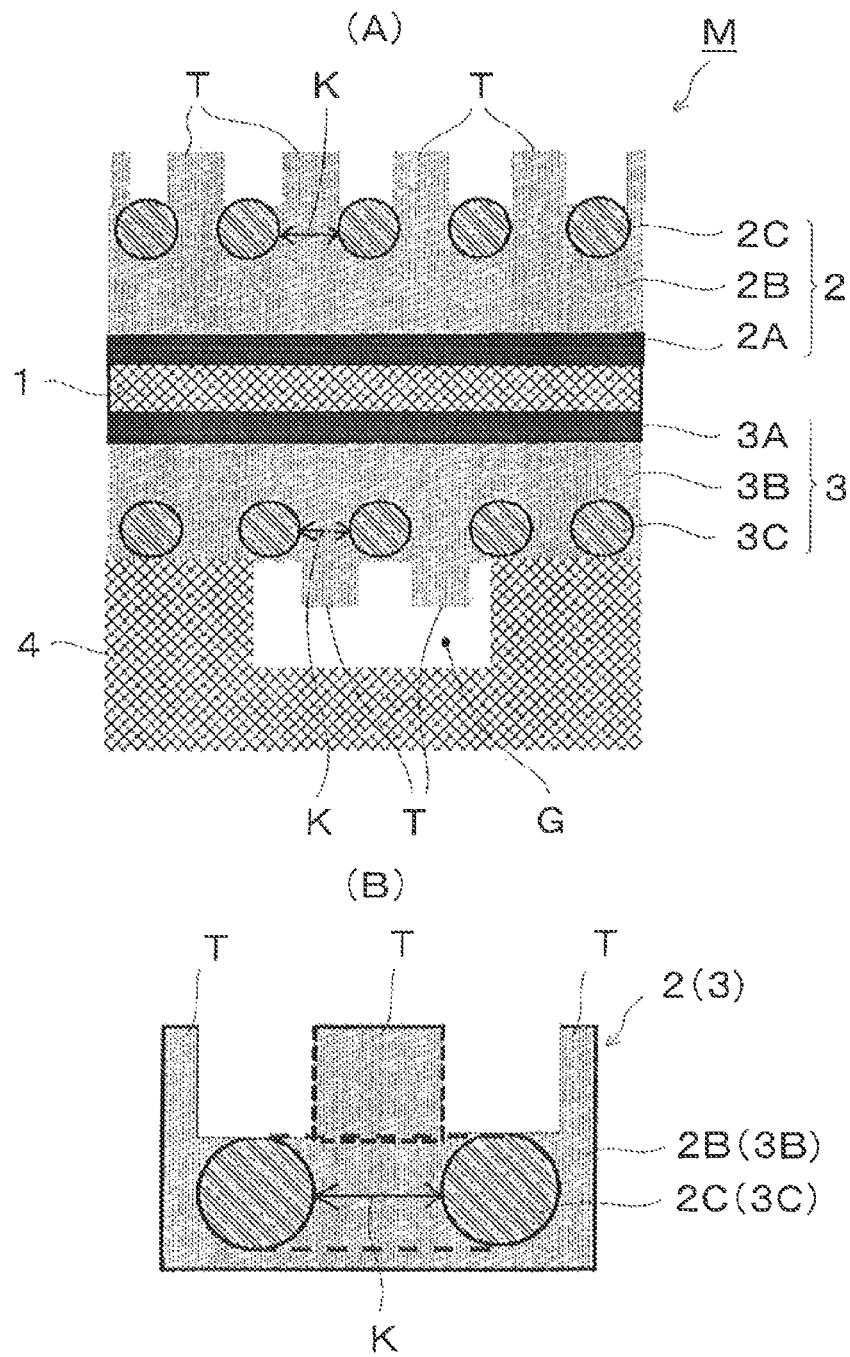
FIG. 5 are (A) a cross sectional view and (B) an enlarged cross sectional view of the main part of a fuel cell single cell according to a third and fourth embodiments.

Regarding protrusions T of first gas diffusion layers 2B, 3B and respective holes K of the second gas diffusion layers 2C, 3C, which correspond to each other in the thickness direction, the single cell of FIG. 5 is configured such that the sum $((Va+Vb)\times(1-\epsilon 1))$ of the actual volume $(Va\times(1-\epsilon 1))$ of the first gas diffusion layers 2B, 3B in a protrusion T and the actual volume $(Vb\times(1-\epsilon 1))$ of the first gas diffusion layers 2B, 3B in a hole K is equal to or less than the volume Vb of the hole K, i.e. $(Va+Vb)\times(1-\epsilon 1)\leq Vb$.

In the above relation, the actual volume of the first gas diffusion layers 2B, 3B refers to the volume of only the solid phase portion (excluding the gas phase portion) of the first gas diffusion layers 2B, 3B, which is constituted by a porous material. Further, Va is the total volume of a protrusion T illustrated by the dashed line in FIG. 5 (B), and Vb is the total volume of the first gas diffusion layers 2B, 3B in a hole K illustrated by the dashed line in FIG. 5 (B), which is equal to the volume of the hole K. In the above relation, the actual volume of the first gas diffusion layer 2B, 3B in a protrusion T or a hole K is expressed by the total volume Va of the protrusion T, the volume Vb of the hole K and the porosity $\epsilon 1$ of the first gas diffusion layers 2B, 3B.

As with the previous embodiments, in the single cells C with the above-described configuration, the surface of the electrode layers 2, 3 have enhanced surface properties due to the fine uneven structure and are also highly water repellent due to the first gas diffusion layers 2B, 3B. Therefore, an improvement in liquid water discharging function and an improvement in power generating function can be achieved at the same time. Further, the single cells C are configured such that when the membrane electrode assembly M is joined to the separators 4, some of the protrusions T are squashed by the separators 4 as illustrated in the lower part of FIG. 5 (A).

That is, since the single cell C is configured such that the sum of the actual volume of the first gas diffusion layers 2B, 3B in a protrusion T and the actual volume of the first gas diffusion layers 2B, 3B in a hole K is equal to or less than the volume of the hole K, the first gas diffusion layers 2B, 3B in the hole K have a room (pores) for accommodating the protrusion T. Accordingly, the separators 4 squash some protrusions T as illustrated in the figure to come in contact with the second gas diffusion layers 2C, 3C, which are constituted by a metal porous body, and the electrical contact resistance between them are thus reduced. Therefore, the power generation performance can be further improved.

(Fourth Embodiment)

As previously illustrated in FIG. 5, regarding protrusions T of first gas diffusion layers 2B, 3B and respective holes K of the second gas diffusion layers 2C, 3C, which correspond to each other in the thickness direction, the single cell C according to this embodiment is configured such that the sum $((Va+Vb)\times(1-\epsilon 1))$ of the actual volume $(Va\times(1-\epsilon 1))$ of the first gas diffusion layers 2B, 3B in a protrusion T and the actual volume $(Vb\times(1-\epsilon 1))$ of the first gas diffusion layers 2B, 3B in a hole K is equal to or less than the volume Vb of the hole K, i.e. $(Va+Vb)\times(1-\epsilon 1)\leq Vb$.

In this single cell C, the sum $((Va+Vb)\times(1-\epsilon 1))$ of the actual volume of the first gas diffusion layer 2B, 3B in a protrusion T and the actual volume of the first gas diffusion layer 2B, 3B in a hole K is further selected based on porosity $\epsilon 2$, which is the porosity of the first gas diffusion layers 2B, 3B after the protrusion T is compressed into the hole K.

More specifically, the actual volume $(Vb\times(1-\epsilon 2))$ of the first gas diffusion layers 2B, 3B after the protrusion T is compressed into the hole K is equal to or greater than the actual volume $((Va+Vb)\times(1-\epsilon 1))$ of the first gas diffusion layers 2B, 3B in the protrusion T and the hole K before the compression, i.e. $(Va+Vb)\times(1-\epsilon 1)\leq Vb\times(1-\epsilon 2)$.

As with the previous embodiments, in the single cell C with the above-described configuration, the surface of the electrode layers 2, 3 have enhanced surface properties due to the fine uneven structure and are also highly water repellent due to the first gas diffusion layers 2B, 3B. Therefore, an improvement in liquid water discharging function and an improvement in power generating function can be achieved at the same time. Further, the single cell C is configured such that when the membrane electrode assembly M is joined to the separators 4, the separators 4 squash the protrusions T illustrated in the lower part of FIG. 5 (A) to come in contact with the second gas diffusion layers 2C, 3C, the electrical contact resistance between them are thus reduced. Therefore, the power generation performance can be further improved.

Furthermore, in the single cells C, since the sum of the actual volume of the first gas diffusion layer 2B, 3B in a protrusion T and the actual volume of the first gas diffusion layer 2B, 3B in a hole K are selected based on the porosity ϵ2 of the first gas diffusion layers 2B, 3B after the protrusion T is compressed into the hole K, the first gas diffusion layers 2B, 3B in the hole K still have the predetermined porosity ϵ2 even after the protrusion T are compressed. Therefore, the gas diffusion can be retained at a high level. In other words, the first gas diffusion layers 2B, 3B have such a porosity that the layers remain porous after the compression.

(Fifth Embodiment)

Figure 6:
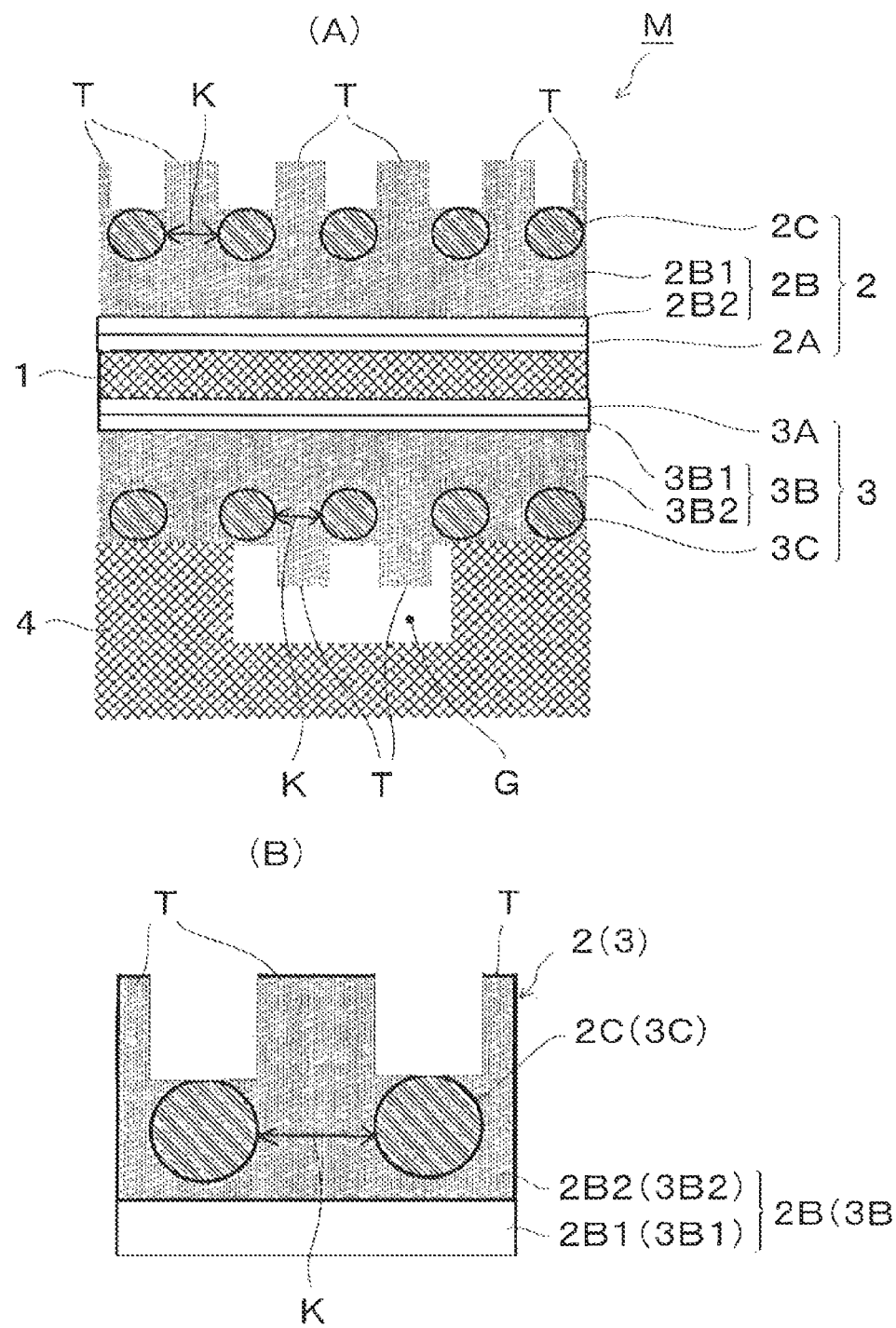
FIG. 6 are (A) a cross sectional view and (B) an enlarged cross sectional view of the main part of a fuel cell single cell according to a fifth embodiment.

In the single cell illustrated in FIG. 6, first gas diffusion layers 2B, 3B include inner diffusion layers 2B1, 3B1 on the side facing an electrolyte membrane and outer diffusion layers 2B2, 3B2 on the side facing the second gas diffusion layers 2C, 3C. In the single cell C, the outer diffusion layers 2B2, 3B2 partly penetrate the second gas diffusion layers 2C, 3C through holes K to protrude outward so as to form the fine uneven structure of the surface of the electrode layers 2, 3.

The membrane electrode assembly M of the single cells according to the above-described embodiments can be formed by pressing the first and second gas diffusion layers 2B, 3B, 2C, 3C against each other to plastically deform the first gas diffusion layers 2B, 3B in the thickness direction so that a part of the first gas diffusion layers 2B, 3B is pushed into holes K of the second gas diffusion layers 2C, 3C.

In this process, in the membrane electrode assembly M, the porosity is inevitably decreased since the solid phase portions of the second gas diffusion layers 2C, 3C compress the first gas diffusion layers 2B, 3B. However, in this embodiment, the first gas diffusion layers 2B, 3B can retain good gas diffusion property, for example, by joining the outer diffusion layers 2B2, 3B2 of the first gas diffusion layers 2B, 3B with the second gas diffusion layers 2C, 3C to form the protrusions T and thereafter forming the inner diffusion layers 2B2, 3B2.

It is also effective that the first gas diffusion layers 2B, 3B are configured such that the strength of the inner diffusion layers 2B1, 3B1 is higher than the strength of the outer diffusion layers 2B2, 3B2. In this case, the inner diffusion layer 2B1, 3B1 are joined with the outer diffusion layers 2B2, 3B2 to form the first gas diffusion layers 2B, 3B beforehand, and then the first gas diffusion layers 2B, 3B are joined with the second gas diffusion layers 2C, 3C to form the protrusions T. As a result, only the outer diffusion layers 2B2, 3B2 are plastically deformed. Even when the porosity of the outer layers is decreased, the gas diffusion can be retained at a high level due to the inner diffusion layers 2B1, 3B1.

As with the previous embodiments, in the single cell C with the above-described configuration, the surface of the electrode layers 2, 3 have enhanced surface properties due to the fine uneven structure and are also highly water repellent due to the first gas diffusion layers 2B, 3B. Therefore, an improvement in liquid water discharging function and an improvement in power generating function can be achieved at the same time, and the electrode layers 2, 3 can be designed more flexibly.

The configuration of the fuel cell single cell according to the present invention is not limited to that of the above-described embodiments, and the details of the configuration may be suitably changed without departing from the gist of the present invention.

REFERENCE SIGNS LIST

FC Fuel cell
G Gas channel
K Hole
M Membrane electrode assembly
T Protrusion
1 Electrolyte membrane
2 Electrode layer 2 (anode)
3 Electrode layer 3 (cathode)
4 Separator
2B, 3B First gas diffusion layer
2B1, 3B1 Inner diffusion layer (first gas diffusion layer)
2B2, 3B2 Outer diffusion layer (first gas diffusion layer)
2C, 3C Second gas diffusion layer

The invention claimed is:

1. A fuel cell single cell, comprising:
a membrane electrode assembly in which an electrolyte membrane is interposed between a pair of electrode layers; and
a pair of separators that form gas channels between the pair of separators and the membrane electrode assembly,
wherein an electrode layer of the membrane electrode assembly comprises a first gas diffusion layer of a porous material disposed on a side facing the electrolyte membrane and a second gas diffusion layer comprising a metal porous body with arrayed many holes, and a part of the first gas diffusion layer penetrates the second gas diffusion layer entirely through and beyond each hole to form a protrusion for each hole.

2. The fuel cell single cell according to claim 1, wherein a surface of the first gas diffusion layer is water repellent.

3. The fuel cell single cell according to claim 2, wherein each of the protrusions of the first gas diffusion layer and each of the respective holes of the second gas diffusion layer that corresponds to each other in a thickness direction satisfy a relation in which a height of each of the protrusions protruding from the holes is equal to or greater than a half of a width of a solid phase portion around each of the holes.

4. The fuel cell single cell according to claim 3, wherein each of the protrusions of the first gas diffusion layer and each of the respective holes of the second gas diffusion layer that corresponds to each other in a thickness direction satisfy a relation
in which a sum of an actual volume of the first gas diffusion layer in each of the protrusions and an actual volume of the first gas diffusion layer in each of the holes is equal to or less than a volume of each of the holes.

5. The fuel cell single cell according to claim 2, wherein each of the protrusions of the first gas diffusion layer and each of the respective holes of the second gas diffusion layer that corresponds to each other in a thickness direction satisfy a relation
in which a sum of an actual volume of the first gas diffusion layer in each of the protrusions and an actual volume of the first gas diffusion layer in each of the holes is equal to or less than a volume of each of the holes.

6. The fuel cell single cell according to claim 1, wherein each of the protrusions of the first gas diffusion layer and each of the respective holes of the second gas diffusion layer that corresponds to each other in a thickness direction satisfy a relation
> in which a height of each of the protrusions is equal to or greater than a half of a width of a solid phase portion around each of the holes.

7. The fuel cell single cell according to claim 6, wherein each of the protrusions of the first gas diffusion layer and each of the respective holes of the second gas diffusion layer that corresponds to each other in a thickness direction satisfy a relation
> in which a sum of an actual volume of the first gas diffusion layer in each of the protrusions and an actual volume of the first gas diffusion layer in each of the holes is equal to or less than a volume of each of the holes.

8. The fuel cell single cell according to claim 1, wherein each of the protrusions of the first gas diffusion layer and each of the respective holes of the second gas diffusion layer that corresponds to each other in a thickness direction satisfy a relation
> in which a sum of an actual volume of the first gas diffusion layer in each of the protrusions and an actual volume of the first gas diffusion layer in each of the holes is equal to or less than a volume of each of the holes.

9. The fuel cell single cell according to claim 8, wherein the sum of the actual volume of the first gas diffusion layer in each of the protrusions and the actual volume of the first gas diffusion layer in each of the holes are selected according to a porosity of the first gas diffusion layer after each of the protrusions is compressed into each of the holes.

10. The fuel cell single cell according to claim 1, wherein the first gas diffusion layer comprises an inner diffusion layer on a side facing the electrolyte membrane and an outer diffusion layer on a side facing the second gas diffusion layer, and a part of the outer diffusion layer penetrates the second gas diffusion layer through the holes to protrude outward.

* * * * *